Feb. 25, 1969
W. F. KOSONOCKY
LASER DIGITAL DEVICE
3,430,160
Filed June 11, 1965
Sheet 1 of 3
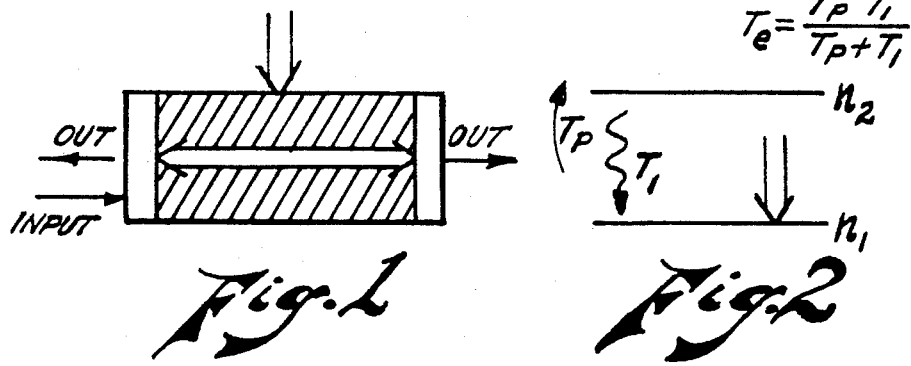
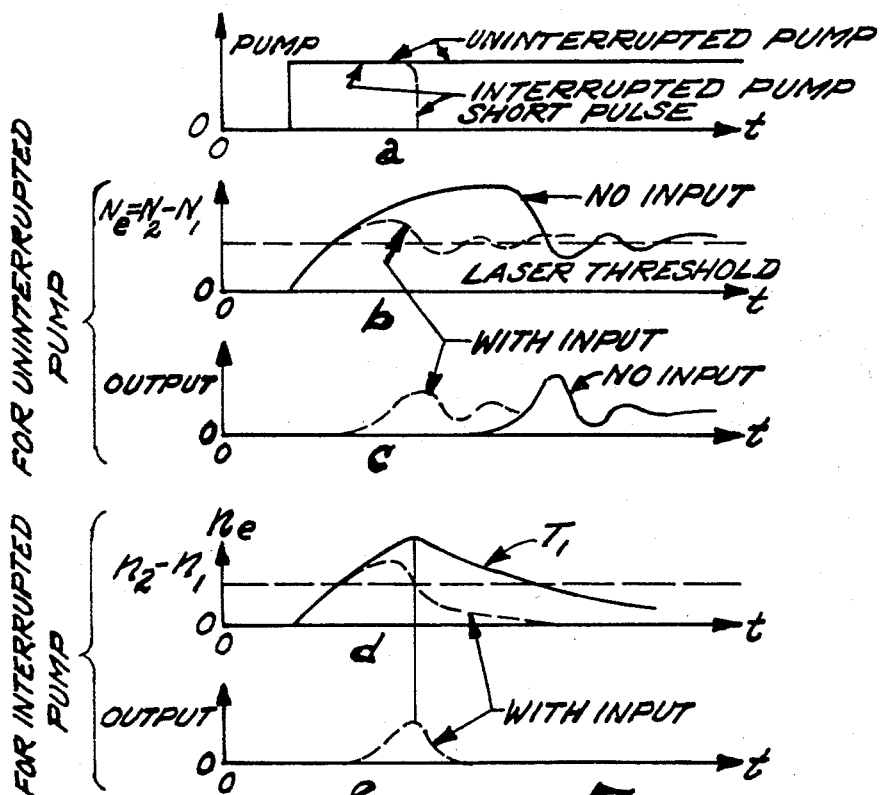
INVENTOR
WALTER F. KOSONOCKY
BY Harry A. Herbert Jr.
George Line
ATTORNEYS

3,430,160
LASER DIGITAL DEVICE
Walter F. Kosonocky, Iselin, N.J., assignor to the United States of America as represented by the Secretary of the Air Force
Filed June 11, 1965, Ser. No. 463,411
U.S. Cl. 331—94.5
Int. Cl. H01s 3/11
4 Claims

ABSTRACT OF THE DISCLOSURE

A laser digital device in which a laser material is shared by two separate resonant structures wherein one input signal will excite resonant modes only in one resonant structure and another input signal will only excite resonant modes in the other resonant structure. With one of the signals being a clock pulse, the device can act either as an OR circuit or as a NOR circuit.

---

This invention relates to a laser digital device and more particularly to an A.C. (alternating current) pumped laser digital device.

The present invention provides a technique for operating laser or maser oscillators as digital devices. These devices exhibit threshold for amplification when powered by a periodic pump signal whose duration is comparable to the delay of the buid up of oscillations of the laser oscillator. These types of devices can also be used as modulators or demodulators of optical signals.

In one embodiment of the present invention a laser material is shared by two separate resonant structures. One input signal will excite resonant modes only in one resonant structure and another input signal will only excite in the other resonant structure. If one of the signals is a clock pulse, the embodiment can act either as an OR circuit or as a NOR circuit.

An object of the present invention is to provide a technique for operating laser oscillators as digital devices for use in a digital computer.

Another object of the present invention is to provide a device powered by a periodic pump power source which operates as a regenerative laser amplifier.

Yet another object of the present invention is to provide an A.C. pumped laser inverter utilized as a basic digital circuit.

Still another object of the present invention is to provide a laser system in which a laser material is shared by two separate resonant structures.

The features of this invention, which are believed to be new, are set forth with particularity in the appended claims. The invention itself, however, together with further objects and advantages thereof may best be understood by reference to the following description when taken in conjunction with the accompanying drawings, in which:

FIGURE 1 is a schematic of the laser resonator;

FIGURE 2 is the model for the laser material of FIGURE 1;

FIGURE 3a illustrates the waveforms of pump signals (a pulse and step) as a function of time;

FIGURE 3d illustrates the time variation of the emissive population difference;

FIGURE 3c illustrates the output signals for uninterrupted pump;

FIGURE 3d illustrates the population difference for interrupted pump;

FIGURE 3e illustrates output signals for interrupted pump;

Figure 5:
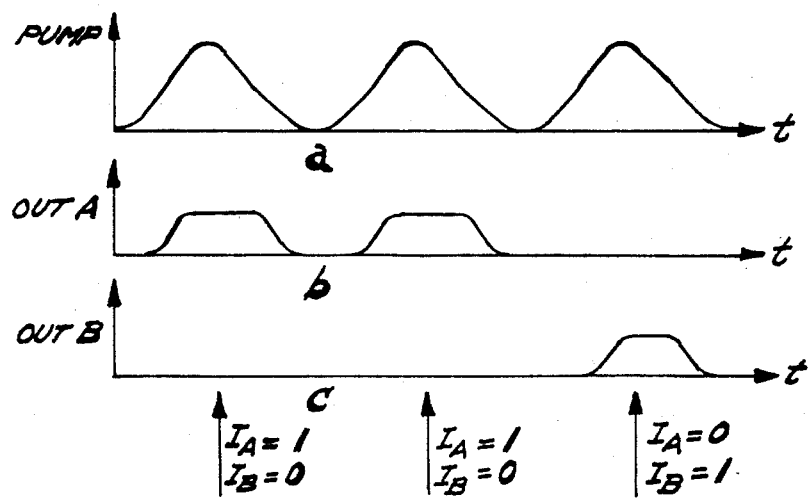
Figure 6:
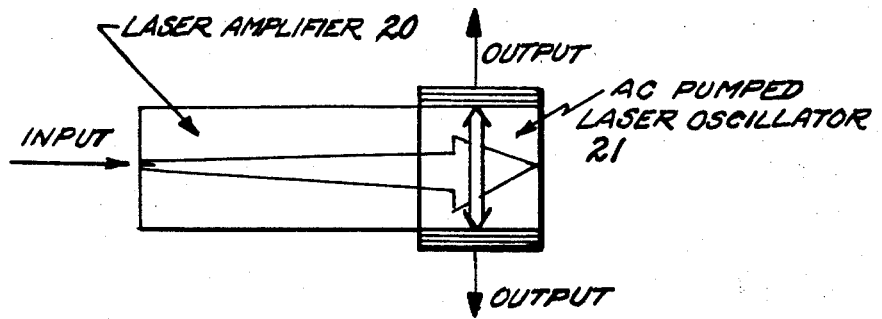

FIGURES 5a, b, and c, show waveforms of input-output relationships;

FIGURE 6 illustrates an A.C. pumped laser inverter circuit; and

Figure 7:
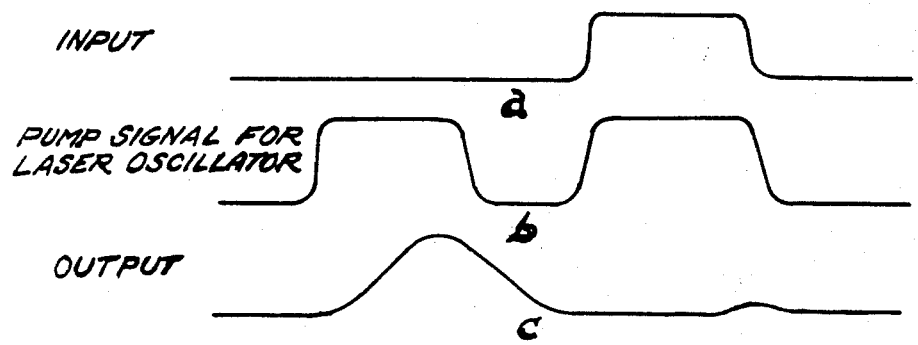

FIGURES 7a, b, c illustrate waveforms associated with FIGURE 6 showing input, pump signal and output signals.

Now referring to FIGURE 1 which is a schematic view of the laser resonator structure including laser material $n_e$ to which an input can be applied from a similar laser. The model for aforesaid emissive material is shown in FIGURE 2. If a pump source is in the form of a short pulse as shown in FIGURE 3a, the occurrence of an output signal depends on the presence of an input signal.

In FIGURE 3a, two types of pump signal are shown, a pulse or interrupted pump signal and a step or uninterrupted pump signal. In FIGURES 3b and c, the expected variation of the emissive population difference, $n_e = n_2 - n_1$, and the output signal $P_0$ are illustrated for an uninterrupted pump when the input is present (dashed lines) and when the input is not present (solid lines). The main difference between the two output signals is due to the much shorter delay time before the output starts to build up when an input is present. In FIGURES 3d and e response is shown for the case of a pump source in the form of a short pulse. Now, in the absence of the input signal the emissive population difference drops below the laser threshold level (or loop gain of unity) before the output signal has a chance to build up to any appreciable value.

Figure 4:
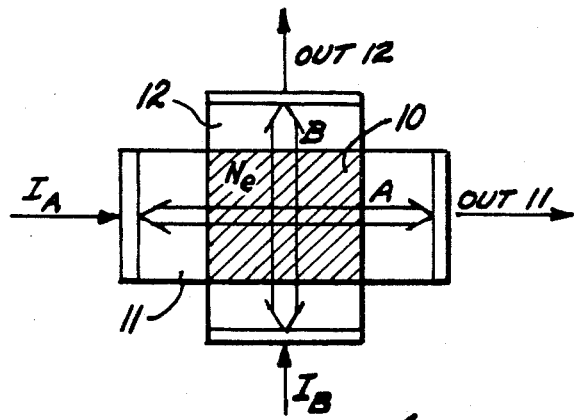
FIGURE 4 is a schematic of a double laser resonator with both resonators sharing the same emitter.

One embodiment of this principle of "risetime threshold" is illustrated by the circuit in FIGURE 4 wherein the laser material, $N_e$, hereinafter designated by numeral 10 is shared by two separate resonant structures 11 and 12. An input $I_A$ will excite resonant modes only in resonator 11 and input $I_B$ will excite only in resonator 12. With a periodic pump source signal as illustrated in FIGURE 5a, the operation of this circuit resembles the operation of a difference amplifier, when signals $I_A$ and $I_B$ occur simultaneously. In contrast to the previous circuit in FIGURE 1, the laser could be discharged during each cycle of the pump. If one of the signals is a clock pulse, this type of circuit could act either as an OR circuit or a NOR circuit. Double line logic would be applicable for this type of circuit. Unidirectional, information signal flow can be obtained by various multiphase pump arrangements, similar to those for the "balanced pair" tunnel diode logic or for the parametric oscillator logic.

The operation of the aforementioned described circuits is based on the principle that is similar to that of the regenerative electronic amplifier. It should be noted that the circuit of FIGURE 1 when powered by a periodic pump power source will operate as a regenerative laser amplifier. As such it could be used as a modulator or demodulator (detector) of optical signals.

An alternative use of the regenerative laser amplifier for digital circuits is in conjunction with a laser inverter circuit. The approach to be described will make the inverter circuit more sensitive. As shown in FIGURE 6, the inverter circuit is composed of continuously pumped laser amplifier 20 the output of which will tend to inhibit laser oscillator 21. Laser oscillator 21 is pumped by a periodic pump source. The duration of the pump pulse is just long enough to permit a full build up of the output in the laser oscillator, thus increasing the delay time and reducing the amplitude of the output. This operation is illustrated by the waveforms shown in FIGURES 7a, b, and c illustrating input signal, pump signal for laser oscillator, and output signal respectively.

Such A.C. pumped laser inverter can be used as a basic digital circuit (with pulse outputs) or as a special clock pulse generator in conjunction with the continuously powered laser digital circuits. It could, however, also be used as a modulator or demodulator of optical signals.

The main advantage of the A.C. pumped laser devices for logic circuits over the continuously powered laser circuits is higher sensitivity or higher digital gain. In addition, this principle of regenerative laser amplification can be used in construction of modulators and demodulators of optical signals.

What I claim is:

1. In an alterating current pumped laser device comprising two separate resonant structures, a laser material shared by said two separate resonant struuctures, one of said resonant structures being excited in its resonant mode by a first signal, and the second resonant structure by a second signal, and means to provide a periodic pump source signal to said device.

2. In an alternating current pumped laser device comprising two separate laser resonant structures, a laser material sharing said two separate laser resonant structures, the first of said separate resonant structures receiving a first input signal for excitation purposes and the second of said resonant structures receiving a second input signal for excitation purposes, one of said two input signals being a clock pulse, and a third signal provided by a periodic pump source for said device.

3. In an alternating current pumped laser device comprising two separate resonant structures, a laser material sharing said resonant structures, the first of said resonant structures receiving a first input signal for excitation purposes, the second of said resonant structures receiving a second input signal also for excitation purposes, and an alternating current pump source signal for said device, said first resonant structure providing first pulse output signals and said second resonant structure provide a second pulse output signal.

4. In an alternating current pumped laser digital device comprising two separate laser resonant structures, an emissive laser material sharing said two resonant structures, the first of said resonant structures receiving a first input signal for excitation purposes, and the second resonant structure receiving a second input signal also for excitation purposes, one of said two input signals being a clock pulse, and a periodic pump source to provide an alternating current signal to said laser emissive material, said first resonant structure providing a first output signal and said second resonant structure providing a second output signal.

References Cited

UNITED STATES PATENTS 3,177,446   4/1965   Hoadley et al. _____ 331—94.5

OTHER REFERENCES

Lasher et al.: Mutually Quenched Injection Lasers as Bistable Devices, IBM Journal of Research and Development, vol. 8, No. 4 (September 1964), pp. 471–475.

Lasher: Use of Active Filaments in Improving the Quenching Action and Bistable Operation of Injection Lasers, IBM Tech. Discl. Bul., vol. 7, No. 9 (February 1965), pp. 800 and 801.

JEWELL H. PEDERSEN, *Primary Examiner.*

W. L. SIKES, *Assistant Examiner.*